United States Patent [19]

Wycoff et al.

[11] Patent Number: 5,077,508

[45] Date of Patent: Dec. 31, 1991

[54] METHOD AND APPARATUS FOR DETERMINING LOAD HOLDING TORQUE

[76] Inventors: David C. Wycoff, 1020 Kurtis Dr., Elm Grove, Wis. 53122; William A. Hipp, 2175 Michelle Ct., Brookfield, Wis. 53005

[21] Appl. No.: 303,322

[22] Filed: Jan. 30, 1989

[51] Int. Cl.[5] .............................................. H02P 3/26

[52] U.S. Cl. .................................. 318/436; 318/758; 187/115

[58] Field of Search ............... 318/757, 758, 741, 742, 318/436, 430, 431, 371, 372; 254/316, 322, 903; 187/115, 119

[56] References Cited

U.S. PATENT DOCUMENTS

| | | | |
|---|---|---|---|
| 3,244,957 | 4/1966 | Spiess et al. | 187/115 |
| 3,331,003 | 7/1967 | King | 318/798 |
| 3,486,101 | 12/1969 | Rufli | 318/436 |
| 4,207,508 | 6/1980 | Habisohn | 318/742 |
| 4,479,565 | 10/1984 | Nomura | 187/119 |
| 4,503,937 | 3/1985 | Cervenec et al. | 187/119 |
| 4,561,073 | 3/1987 | Shimizu et al. | 318/758 |
| 4,681,191 | 7/1987 | Ikejima | 187/119 |

*Primary Examiner*—David Smith, Jr.

[57] ABSTRACT

A motor control method and apparatus for a hoist is disclosed in which a drive motor is connected to an adjustable frequency power supply in which the frequency of the power supplied to the motor can be selectively varied. At the initiation of a hoist operation, when the hoist brake is holding the motor and an object constituting a load on the motor stationary, power is supplied to the motor at a predetermined low frequency which is sufficient to provide load holding torque upon release of the brake. The actual current level of the power supplied to the motor is sensed at the initiation of the hoist operation and a signal representative of that current level is compared with a reference signal representative of a current level which is sufficient to provide the load holding torque. If the signal representative of the actual current level of the power supplied to the motor exceeds the reference signal, an output signal is provided which will result in the release of the hoist brake from its holding condition.

6 Claims, 2 Drawing Sheets

METHOD AND APPARATUS FOR DETERMINING LOAD HOLDING TORQUE

FIELD OF THE INVENTION

This invention relates to alternating current drive systems for driving loads in which the drive system is subject to losing movement control over the load. More particularly, the invention relates to adjustable frequency motor drive systems for hoist and crane applications in which load control torque is required at the initiation of hoist operation.

BACKGROUND OF THE INVENTION

There are many applications of electrically driven equipment in which suddenly applied or overhauling loads or both are encountered. One of the more common of these applications involves hoisting equipment. Hoists commonly incorporate a drive motor, a drum on which a lifting cable is wound, and a holding brake for stopping and holding the lifted load. When the holding brake is released to permit movement of a suspended load, the drive motor must immediately provide sufficient torque to maintain control over the load. If for any reason the motor fails to produce the necessary torque, the load can be dropped causing serious damage and possible personnel injury. Similarly, if the drive motor is producing the torque level necessary to control the load during a raising or lowering operation and the motor torque drops below that level, the same results may occur.

Historically, a number of different types of electrical systems have been designed for the control of hoisting machinery. The earliest of these utilized two brake. One brake was a holding brake for stopping and holding the load and usually was of a spring applied and electrically released type. The second brake was applied mechanically in the hoist lowering direction by the action of the overhauling load suspended from the hoist, in order to prevent uncontrolled lowering. In order to lower a load with this system, it was necessary for the motor to develop torque in the lowering direction sufficient to release the mechanical load brake so that it could provide lowering control. Although this system provided for safe operation, it had several serious deficiencies in that the lowering control brake was noisy, inefficient, and subject to a high degree of wear. Systems powered by direct current motors with series fields later became available in which the motor developed braking as well as driving torque This allowed a load to be lowered without resort to mechanical load brakes or other secondary braking means. Some protection against loss of load control was provided with these systems by making the release of the holding brake dependent on the existence of a certain minimum amount of motor current. The control was such that variable speeds both in hoist raising and lowering were provided.

In time, direct current power systems largely were replaced with alternating current systems. However, the use of alternating current motors with hoisting equipment has been handicapped by the fact that such motors tend to run at a speed determined entirely by the frequency of the alternating current power supply. The difficulty is compounded by the fact that the alternating current motor cannot develop braking torque when overdriven at less than its normal full speed. Thus, slow lowering speeds cannot be attained except with auxiliary or secondary braking means. With the advent of electronic and solid state power conversion, adjustable voltage control systems using direct current motors with shunt fields to power hoisting machinery from an alternating current power supply have become common. Since this type of motor can develop torque at any speed when acted on by an overhauling load, secondary braking devices are not necessary. However, the only protection against loss of motor torque during operation normally provided is through overspeed and field loss sensing devices which are utilized to cause the holding brake to be applied.

More recently, adjustable frequency drive systems for alternating current induction motors have been developed. While these systems provide some desirable performance characteristics, they have not been widely used with hoisting machinery, at least in the absence of secondary braking devices, because of their greater tendency to lose control of the load.

SUMMARY OF THE INVENTION

It is a general object of this invention to provide an adjustable frequency motor drive system including protection against loss of load movement control. Another object of the invention is to provide, in an adjustable frequency motor drive system. A method and apparatus in which the level of the motor torque available is determined during the supply of power to the motor at the initiation of a drive operation and prior to the release of a brake holding the motor and any load coupled to the motor.

The invention is carried out by providing a drive motor with an adjustable frequency power supply in which the frequency of the power supplied to the motor can be selectively varied. At the beginning of a drive operation, a brake is holding the motor and an object constituting a load on the motor stationary. The drive operation is initiated by supplying power to the motor at a current level and at a low frequency such that the power is sufficient to provide holding torque for any expected load within the safe operating capacity of the motor upon release of the brake. The actual current level of the power supplied to the motor is then sensed and a signal representative of such actual current level is compared with a reference signal representative of that current level which is sufficient to provide the load holding control torque. If the signal representative of the actual current level of the power supplied to the motor exceeds the reference signal, an output signal is provide which will enable the release of the brake from its holding condition.

The load holding torque, determined by the actual current level of the initial power supplied may, for example, be in the range of 125% to 200% of rated full load torque of the motor. Selection of the current level for this load holding torque level will depend on the power supply and the motor characteristics.

BRIEF DESCRIPTION OF THE DRAWINGS

Further objects and advantages of the invention will appear when taken in conjunction with the accompanying drawings, in which.

DETAILED DESCRIPTION OF THE INVENTION

Figure 1:
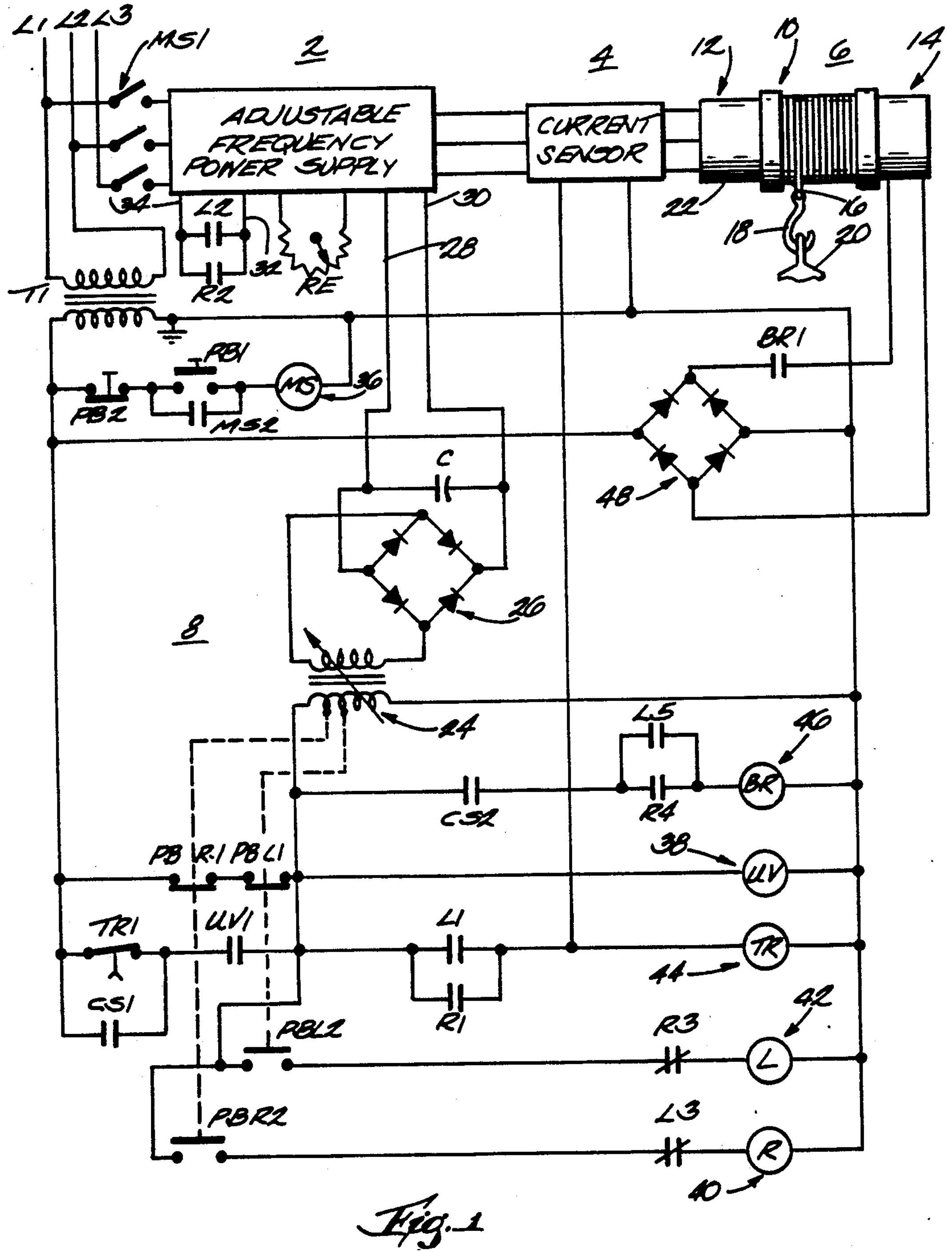
FIG. 1 is a schematic diagram of an adjustable frequency drive apparatus according to the invention.

Referring generally to FIG. 1, three phase, 60 hertz power from lines L1, L2 and L3 is supplied through switches MS1 (when closed) to an adjustable frequency power supply 2 which, in turn, provides power through a current sensor 4 to a hoist 6 A.C. control power supply is provided to a control circuit 8 through transformer T1 connected across lines L1 and L2. The hoist 6 comprises a drum 10, a motor 12 which drives the drum 10, and an electromagnetic brake 14 for stopping or holding the drum 10. A cable 16 having a hook 18 at its lower end is affixed to the drum 10 and may be wound onto or paid out from the drum 10 to lower or raise an object such as load 20 carried by the hook. The motor 12 is preferably a three phase squirrel-cage induction type which may, for example, have a rated synchronous speed of 1200 rpm at 60 hertz. The motor drives the drum 10 through gear means (not shown) in a rotational direction to either wind the cable 16 onto the drum 10 and raise the load 20 or pay the cable 16 out from the drum 10 and lower the load 20. The rotational direction of the motor 12 and thereby the raising or lowering of the load 20 is determined by the phase sequence of the three phase power supply to the stator 22. A bridge rectifier 48 is connected across the control transformer T1 for providing a d.c. power source to the brake 14. The electromagnetic brake 14 is connected to the rectifier 48 through a contact BR1 as will be described in greater detail hereinafter. The main switch operating circuit 36 includes a main switch relay coil MS having normally open contacts MS1 and MS2 which are operated by the MS coil, a normally open start push button PB1, and a normally closed stop push button PB2. In order to provide 60 hertz alternating current power to the adjustable frequency power supply 2, the start push button PB1 is depressed to energize relay coil MS which thereby closes contacts MS1 to provide the alternating current power from lines L1, L2, and L3 to the power supply 2 and closes contact MS2 to maintain the MS coil energized. In order to disconnect the alternating current power to the power supply 2, the stop push button PB2 is depressed to deenergize the MS coil and cause the opening of contacts MS1 and MS2.

The undervoltage relay 38 includes undervoltage coil UV and contact UV1. When the control circuit 8 is energized through transformer T1, the UV coil is also energized through the contacts of push buttons PBR1 and PBL1 to thereby close contact UV1. The raise relay 40 includes raise coil R having normally open contacts R1, R2, R4 and closed contact R3. The lower relay includes lower coil L having normally open contacts L1, L4 and L5 and normally closed contact L3. The power supply 2 is controlled or "requested" to provide power to the motor 12 by the closure of either one of the external contacts L2 or R2 which are connected to the power supply 2 on lines 32, 34. The contacts L2, R2 are relay contacts operated as a result of operation of the master switch 24 as will be discussed further hereinafter.

The current sensor 4 is connected to the output power supply of the adjustable frequency power supply 2 and is preferably connected such that it provides an indication of current value on all three phases of the power supply to the motor 12. The current sensor 4 includes contacts CS1 and CS2 connected in the control circuit 8. The current sensor functions such that at the beginning or during the time that an actual current level is sensed in all three phases of the power supply output from the power supply 2 which equals or exceed a minimum preselected or predetermined current value, both of the contacts CS1 and CS2 will be closed. If the actual current level from the power supply 2 is less than the preselected current level, the contacts CS1 and CS2 will open if they have been closed or stay open if they have been open. The opening of the contacts CS1 and CS2 or their remaining open may be considered as providing a first signal causing the brake to remain in a holding condition. The closing of the contacts CS1 and CS2 or their remaining in a closed condition provides a second signal to cause release of the brake 14. At the initiation of a drive operation, the preferred minimum preselected current level is the maximum current the power supply 2 can produce to the particular motor 12 to which it is connected when the motor is stalled prior to brake release. This value might be, for example. 200% of rated full load motor current. During a drive operation, while the current sensor 4 is monitoring the current level being supplied to the motor, the preferred minimum preselected current level is the rated no-load current of the motor 12. Thus, two different current levels are utilized as preselected values required to initiate and maintain a drive operation.

The control circuit 8 includes the bridge rectifier 26 connected across the output of the master switch 24, a capacitor C connected across the output of the bridge 26, a main switch operating circuit 36, an undervoltage relay 38, the raise and lower relays 40 and 42, a timer relay 44, a brake relay 46, contact pair PBR1, PBR2, and contact pair PBL1 and PBL2. A spring (not shown) within the brake 14 applies the brake and the brake is released by an electromagnetic force when the contact BR1 closes. The brake 14, drum 10 and motor 12 are all well known devices and will not be further described herein except as necessary to describe the instant invention.

The adjustable frequency power supply 2 shown in FIG. 1 receives a three phase 60 hertz power input from the lines L1, L2 and L3 as previously stated. The output of the power supply 2 is a three phase selectively variable frequency output F out to the stator 22 of the motor 12. The power supply 2 is of well known type in which the three phase power input is rectified to full wave direct current power and then converted to three phase alternating current power output where both the voltage and, frequency can be varied while a constant voltage to ratio is maintained. The frequency and thus the voltage are controlled by input signals from an external source. As illustrated in FIG. 1, the external frequency control source is a variable output master switch 24 which produces a variable A.C. voltage signal which is rectified by bridge 26 and provided on lines 28, 30 to the power supply 2. A potentiometer resister RE is a part of the power supply 2 and is adjustable to set the minimum output frequency F out which the power supply can provide to the motor 12. Raise coil R and lower coil L are respectively connected through normally open push button contacts PBR2 and PBL2 across the control voltage of transformer T1 and operate to close their normally open contacts and open their normally closed contact upon closure of one of the push button PBR2 or PBL2 to which they are connected. The timer relay 44 includes coil TR and normally closed contact TR1. The coil TR is energized upon closure of either contact L1 or R1 and provides a time delay after which the contact TR1 is opened. The brake relay 46 includes coil BR and normally open contact BR1 which is closed upon energization of the coil BR through contacts CS1, CS2 and UV1.

In the operation of the adjustable frequency power supply 2 and the hoist 6, following the providing of 60 hertz alternating current power to the power supply 2 through the closure of contacts MS1, one of the mechanically connected pairs of contacts PBR1, PBR2 or PBL1, PBL2 is depressed to provide an energization circuit to either coil R or L of relay circuits 40 or 42. Since the control circuit 8, the power supply 2 and the hoist 10 operate in substantially the same manner upon the depression of either contact pair PBR1, PBR2 or contact pair PBL1, PBL2, except for the different phase sequence of the output frequency F out of power supply 2 resulting from the closure of contact L4 where eoil L is energized in the lowering mode of operation and the consequent difference in rotation direction of the motor 12, only the operation resulting from the energization of relay R will be described. Thus for a hoist raising operation, the push button pair PBR1, PBR2 are depressed a sufficient distance to open normally closed PBR1 and close normally open PBR2. Thereby, coil R is energized to close contact R1 and energize coil TR1 so that a timing operation is begun, to close contact R2 to begin the producing of an output power supply through the current sensor 4 to motor 12, and to open contact R3 to ensure that the lowering coil L cannot be energized while a raising operation is taking place. The push button movement causing the opening or closing of contacts PBR1, PBR2 and PBL1, PBL2 also varies the magnetic coupling between the primary and secondary windings of the master switch 24 to provide a speed reference control signal request on lines 28, 30 to the power supply 2. The speed control signal is a D.C. voltage due to the rectifying of the bridge rectifier 26 and may have a magnitude of up to about 20.0 volts as shown by the abscissa of the graph of FIG. 2 The power supply 2 responds to the speed control signal from the control circuit 8 by producing a corresponding internal power supply control signal which controls the frequency of F out of the power supply 2. The frequency to which the power supply 2 accelerates and thereby the speed to which the motor 12 accelerates is determined by the magnitude of the signal on lines 28 and 30 Which in turn is determined by the extent of the depression of the pushbuttons PBR1 or PBL1 and thereby the change in the magnetic coupling of the switch. However, irrespective of the power supply output frequency F out is requested due to the extent of depression of the pushbuttons PBR1 or PBL1, the power supply 2 will, at the initiation of a hoist operation, provide a minimum frequency F out which is selected by the adjustable setting devices including potentiometer RE. The purpose of preselecting the minimum frequency of the power which is initially provided by the power supply 2 to the motor 12 is to ensure that the initial value of the frequency F out is sufficient to provide a voltage which will in turn produce a motor current and thereby a motor torque which will control or hold the load so that it will not initially slide down. A further need for a minimum initial low frequency is that the frequency must be sufficiently greater than the motor slip frequency at which that torque is produced which will hold a predetermined load on the hoist;

Upon the closure of raise contact R1, as previously mentioned, the timer relay 44 begins a time delay operation which may be, for example, between 0.25 and 0.5 seconds. At the expiration of the time delay, the contact TR1 opens. If, during the time delay, the current sensor 4 has sensed an actual current level in each of the three phases of the power supply to the motor 12 which is equal to or in excess of a preselected current level, it will close the contacts CS1 and CS2. With contact CS1 closed, when contact TR1 opens at the end of the time delay, the coil UV will continue to be energized through the CS1 and UV1 contacts so that control power continues to be provided to the raise coil R through contacts CS1, UV1 and pushbutton contact PBR2. Supplying of this control power to coil R through the contact UV1 is necessary since the power supply 2 provides power to the motor 12 only while the pushbutton contact PBR1 is depressed and thereby open so that, if the coil UV is deenergized, contact UV1 will open and cause deenergization of coil R, opening of contact R2 and thereby terminating of output power from power supply 2.

Closing of contact CS2 energizes coil BR to thereby close contact BR1 and provide the d.c. power supply from bridge rectifier 48 to the electromagnetic brake 14. The brake 14 consequently performs a release operation so that the power supplied to the motor 12 caused a hoist operation at the speed determined by the frequency F out of the power supply in response to the frequency or speed request signal of the master switch 24. Since, due to the minimum preselected frequency setting of the potentiometer resistor RE, the frequency of F out of the output power to the motor 12 will be sufficient to result in a motor current and torque that will at least hold the load on the hoist 6 and prevent slide down of load 20 when the brake is released. If, upon initial producing of power by the power supply 2 to the motor 12, the actual current level of the power supplied is less than the preselected reference current level, the current sensor 4 will not operate to close its contacts CS1 and CS2. Consequently, coil BR will not be energized so that brake 14 does not receive power and does not release. Further, the time delay of the timer relay 44 will be completed to cause opening of contact TR1. Since pushbutton contact PBR1 is being held open by an operator, CS1 has not closed, and TR1 has opened, no control power is supplied to coils UV and R. Therefore, contacts R1 and R2 will open to deenergize the time delay relay 44 and remove the power request signal to power supply 2, and coil UV will be deenergized to cause opening of contact UV1. As a result, control power cannot again be supplied to coil R to permit another hoist operating attempt until the operator releases the push button PBR1 and its contacts close.

Figure 2:
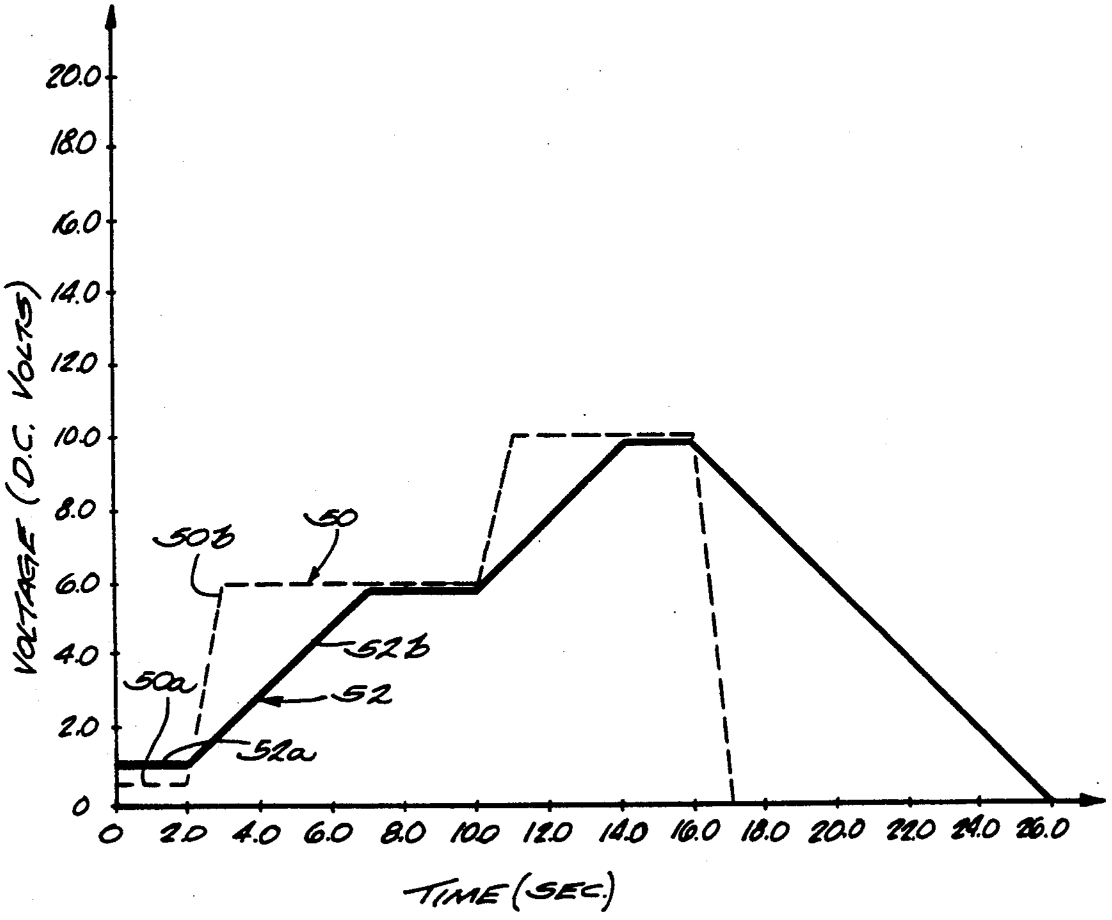
FIG. 2 is a graph illustrating speed request and speed response signals of the apparatus shown in FIG. 1.

With reference to FIG. 2, exemplary graphs are shown which represent speed control reference signal 50 from the master switch 24 to the power supply 2 and a power output control signal 52 which is produced by the power supply 2 in response to the speed control signal 50 and which controls the power output of the power supply 2. The power supply 2 is of a well known type in which the rate of acceleration and deceleration of the frequency F out of its output power may be selectively adjusted. Also, the power supply 2 is adjustable to produce a selected output frequency F out based on the speed request control signal. With reference to FIG. 2, the power supply 2 has been adjusted to have an acceleration/deceleration rate of 6.0 hertz per second and to produce an output frequency of 6.0 hertz per volt of the speed control signal from switch 24. The 6.0 hertz per second acceleration rate is indicated in FIG. 2 by comparing the rate of change of the two signals 50 and 52. Where the signal from the switch 24 is changed rapidly to move from 0.5 volt to 6.0, volts as shown by the area 50*b* of the curve 50, which is a signal calling for a 33 hertz change, the power output signal 52 follows 5.5 seconds later along curve area 52*b* to complete its 33 hertz change. At the beginning of a hoist drive operation, referring to FIG. 2 as an example, the pushbutton PBR1 may be depressed a short distance to the point in its travel that the contacts PBR1 and PBR2 close so that coil R is energized and contacts R1 and R2 close. At this point in the travel of PBR1, the speed control signal from master switch 24 is at a very low value area on its curve 50 of 0.5 volt, which corresponds to a low speed request of 3.0 hertz. However, this low frequency and the corresponding speed of the motor is too low to provide the motor torque required to hold the load 20 upon release of the brake 14. Consequently, the minimum initial frequency of the power supply 2 has been selected at 6.0 hertz, corresponding to 1.0 volts on the area 52*a* of curve 52. Therefore, if the pushbutton PBR1 is depressed a small distance at the beginning of a drive operation such that its speed control signal calls for an output power frequency F out than the preselected low minimum frequency, the power output signal 52 will actually control the power supply 2 to initially produce power to the motor at the preselected minimum low frequency. If the pushbutton PBR1 is depressed a greater distance such that the speed control signal on lines 28, 30 calls for a higher beginning power output frequency, the power output signal will control the power supply 2 to initially provide the minimum preselected low frequency, but the frequency will ramp up at or close to the acceleration rate of the power output signal curve 52 as shown in FIG. 2. The balance of the two curves 50 and 52 indicate the movement of the speed control signal on curve 50 to a value of 10.0 volts, corresponding to a power output frequency F out of 60 hertz, and back to zero volts. The power out signal follows the speed control signal along curve 52 at the preselected acceleration/deceleration rate.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. In a method of controlling an electrical drive subject to loss of movement control over a driven load and having an alternating current motor coupled to and rotatably driving the load, a brake coupled to the motor and load and operable to hold the motor and load from rotating and an adjustable frequency three phase power supply connected to the motor, the steps comprising:

at the initiation of a drive operation, maintaining the brake in a holding condition to hold the motor and load from rotating;

supplying power to the motor from the power supply at the initiation of the drive operation at a current level and at a low frequency sufficient to provide a slip angle permitting production of a predetermined motor torque while the brake is in the holding condition; and sensing the current level of the power supplied to the motor at the initiation of the drive operation and, if the current level is less than that which will produce said predetermined motor torque, providing a first output signal that will cause the brake to remain in its holding condition and, if the current level is greater than or equal to that which will produce said predetermined torque, providing a second output signal that will cause the release of the brake from its holding condition.

2. In a hoist for raising and lowering a load object and having a rotatable drum to which the object is attached, an alternating current motor coupled to the drum for rotatably driving the drum whereby the motor is loaded by the weight of the object, a releasable brake coupled to the drum and motor and having a released condition and a holding condition for holding the drum and motor from rotation and thereby holding the load object stationary, an adjustable frequency power supply connected to the motor, and a controller connected to the motor and the brake for operating the hoist, the improvement comprising:

control means connected to the adjustable frequency power supply and responsive to a motor operation request from the controller for directing the adjustable frequency power supply to provide power to the motor at a predetermined low frequency having a slip angle sufficient to product torque which will maintain movement control over the load object when the brake is in the released condition;

sensing means electrically coupled to the adjustable frequency power supply for sensing the current level of the low frequency power supply to the motor and providing a current level signal representative of said current level; and comparison means for comparing said current level signal with a reference current signal representative of a current value necessary for producing a motor torque which will maintain movement control over the load object upon release of the brake and, if the current level signal exceeds the reference current signal, providing an output signal resulting in the release of the brake from its holding condition.

3. In a method of controlling an electrical drive subject to loss of movement control over a driven load and having an alternating current motor coupled to and rotatably driving the load, a brake coupled to the motor and load and operable to hold the motor and load from rotating, and an adjustable frequency three phase power supply connected to the motor, the steps comprising:

at the initiation of a drive operation, maintaining the brake in a holding condition to hold the motor and load from rotating;

supplying power to the motor from the power supply at the intiation of and continuously during the drive operation including during motor rotation reversal resulting from loss of load control by the motor during the drive operation, the power being supplied at a current level and at a low frequency sufficient to produce a predetermined motor torque;

sensing the current level of the power supplied to the motor at the initiation of the drive operation and, if the current level is less than that which will produce said predetermined motor torque, providing a first output signal that will cause the brake to remain in its holding condition and, if the current level is greater that or equal to that which will produce said predetermined motor torque, providing a second output signal that will cause the release of the brake from its holding condition; and sensing the current level of the power supplied to the motor continuously during the drive operation and, if the current level is less than that which will produce said predetermined motor torque, providing a first output signal that will cause the brake to assume its holding condition and, if the current level is greater than or equal to that which will produce said predetermined motor torque, providing a second output signal that will cause the brake to remain released from its holding condition.

4. In a method of controlling an electrical drive subject to loss of movement control over a driven load and having an alternating current motor coupled to and rotatably driving the load, a brake coupled to the motor and load and operable to hold the motor and load from rotating, and an adjustable frequency three phase power supply connected to the motor, the steps comprising:

at the initiation of a drive operation, maintaining the brake in a holding condition to hold the motor and load from rotating;

supplying power to the motor from the power supply at the initiation of the drive operation at a current level and at a low frequency sufficient to produce a predetermined motor torque;

sensing the actual current level of the power supplied to the motor at the initiation of the drive operation and comparing the actual current level with a first preselected current level which will produce a predetermined motor torque and, if the actual current level is less than the first preselected current level, providing a first output signal that will cause the brake to remain in its holding condition and, if the actual current level is greater than or equal to the first preselected current level, providing a second output signal that will cause the release of the brake from its holding condition; and during the drive operation, comparing the actual current level with a second preselected current level less than the first preselected current level and providing the second output signal to maintain the brake in a released condition if the actual current level is greater than or equal to the second preselected current level.

5. The method according to claim 4 wherein the step of sensing the current level of the power supplied to the motor at the initiation of the drive operation includes comparing the actual current level with a current level equal to the maximum current level which the power supply can provide to the motor when the latter is held from rotating by the brake.

6. The method according to claim 4 or 5 wherein the step of sensing the current level of the power supplied to the motor during the drive operation includes comparing the actual current level with a current level equal to the no-load current level of the motor supplied by the power supply.

* * * * *